United States Patent [19]

Carlblom

[11] Patent Number: 5,637,365
[45] Date of Patent: Jun. 10, 1997

[54] EPOXY-AMINE BARRIER COATINGS WITH ARYLOXY OR ARYLOATE GROUPS

[75] Inventor: Leland H. Carlblom, Richland Township, Allegheny County, Pa.

[73] Assignee: PPG Industries, Inc., Pittsburgh, Pa.

[21] Appl. No.: 620,180

[22] Filed: Mar. 22, 1996

Related U.S. Application Data

[63] Continuation of Ser. No. 357,687, Dec. 16, 1994, abandoned.

[51] Int. Cl.$^6$ ............................ C08K 3/20; C08K 5/06; C08G 59/50; C08L 63/02
[52] U.S. Cl. ................ 428/354; 428/36.6; 428/412; 428/413; 428/483; 428/516; 428/523; 525/523; 525/526; 525/533; 528/97; 528/124; 528/341; 528/361
[58] Field of Search ........................ 525/526, 523, 525/533; 528/97, 124, 341, 361; 428/35.4, 36.6, 412, 413, 483, 516, 523

[56] References Cited

U.S. PATENT DOCUMENTS

| | | | |
|---|---|---|---|
| 2,830,721 | 4/1958 | Pinsky et al. | 215/1 |
| 3,592,946 | 7/1971 | Griffith | 528/121 |
| 3,635,843 | 1/1972 | Parry et al. | 528/97 |
| 4,605,765 | 8/1986 | Miyamoto et al. | 564/367 |
| 4,908,272 | 3/1990 | Harada et al. | 428/412 |
| 4,983,719 | 1/1991 | Fox et al. | 528/340 |
| 5,006,381 | 4/1991 | Nugent, Jr. et al. | 428/35.4 |
| 5,008,137 | 4/1991 | Nugent, Jr. et al. | 428/35.4 |
| 5,028,462 | 7/1991 | Matlack et al. | 428/35.7 |
| 5,300,541 | 4/1994 | Nugent, Jr. et al. | 523/414 |

FOREIGN PATENT DOCUMENTS

| | | |
|---|---|---|
| 0311212 | 4/1989 | European Pat. Off. . |
| 0479445 | 4/1992 | European Pat. Off. . |

OTHER PUBLICATIONS

"Molecular Structure—Physical Property Relationships For Epoxy–Amine Infinite Networks", James R. Griffith, Pap. Meeting—Am. Chem. Soc., Div. Org. Coat. Plast. Chem (1967), 27(1), pp. 294–304.

*Primary Examiner*—Frederick Krass
*Attorney, Agent, or Firm*—Paul S. Chirgott; Dennis G. Millman

[57] ABSTRACT

Polyepoxide-polyamine gas barrier coatings for use on packaging materials such as polymeric containers are provided with low permeability at relatively low amine to epoxy cure ratios by including substantial aryloxy or aryloate group content. The aryloxy or aryloate content may be provided, for example, by polyglycidyl ether of resorcinol or polyglycidyl ester of phthalic acid.

23 Claims, No Drawings

EPOXY-AMINE BARRIER COATINGS WITH ARYLOXY OR ARYLOATE GROUPS

This application is a file wrapper continuation of application Ser. No. 08/357,687 filed Dec. 16, 1994 now abandoned.

BACKGROUND OF THE INVENTION

The present invention relates to resins having gas barrier properties, curable barrier coating compositions utilizing such resins, and to packaging materials and/or containers including the barrier coatings. The barrier coatings substantially reduce the permeability of gases such as carbon dioxide and/or oxygen through packaging materials.

Plastics have found increasing use as replacements for glass and metal containers in packaging, especially of foods and beverages. The advantages of such plastic packaging includes lighter weight, decreased breakage (versus glass) and potentially lower costs. However, shortcomings in the gas-barrier properties of common packaging plastics, such as polyolefins, e.g., polyethylene and polypropylene, poly (ethylene terephthalate) and polycarbonates, present major disadvantages in the packaging of many foods and beverages. For example, many foods and beverages are sensitive to oxidation and must be protected from oxygen to prevent discoloration or other detrimental effects. Further, plastic beverage containers suffer comparative shelf-life problems versus glass or metal due to the loss of carbon dioxide or ingress of oxygen through the plastic container.

In addition to food applications, barrier coatings have utility for plastic medical ampoules and the like and for plastic fuel containers.

Numerous barrier coatings have been developed in the prior art, including barrier materials based on thermoplastic, crystalline resins such as vinylidene chloride or ethylene-vinyl alcohol. Each of these materials has drawbacks. Ethylene-vinyl alcohol-based polymers lose barrier properties upon exposure to water, and packages of this material cannot generally undergo retort, i.e., heating under pressurized steam for pasteurization without loss of barrier performance. Vinylidene chloride-based polymers have been recognized as having excellent gas-barrier properties, but preparation of such vinylidene chloride-based polymers must generally be done under high pressure. Further, since vinylidene chloride-based barrier materials include halogen atoms, the disposal of such materials via incineration poses environmental problems. In addition, both vinylidene chloride-based polymers and ethylene-vinyl alcohol based polymers exhibit loss of adhesion after undergoing retort.

U.S. Pat. No. 2,830,721 (Pinsky et al.) discloses a polyamine-polyepoxide barrier coating for plastic containers. The purpose is to reduce the permeation of organic solvents through polyethylene containers. For polymeric food and beverage containers, it would be desirable to provide barrier coatings that have lower oxygen and/or carbon dioxide permeabilities and less sensitivity to humidity than those disclosed in the Pinsky et al. patent.

Barrier coatings with very low permeability based on polyamine-polyepoxide resins with high amine nitrogen content are the subject of commonly owned U.S. Pat. No. 5,300,541, U.S. Pat. No. 5,006,381, and U.S. Pat. No. 5,008,137 (all to Nugent et al.). Preferred polyamines disclosed there are polyethylene polyamines such as tetraethylene pentamine, and the coatings of the preferred embodiments are characterized by amine nitrogen content of at least seven percent. These coatings have found commercial acceptance as barrier coatings for polymeric containers. Co-pending, commonly owned U.S. patent application Ser. No. 08/221,161, now abandoned discloses epoxy-amine barrier coatings containing metaxylylene diamine having improved performance under high humidity conditions, and in which the coatings are characterized by a cure ratio of at least 1.5 to 1 amine hydrogen equivalents to epoxy equivalent.

Metaxylylene diamine is known as a curing agent for polyepoxide resins. U.S. Pat. No. 4,605,765 (Miyamoto et al.) further discloses the use of the amine functional reaction product of metaxylylene diamine with epichorohydrin as a curing agent for polyepoxide resins.

The prior art (e.g., U.S. Pat. Nos. 4,908,272; 4,983,719; and 5,028,462) disclose reacting meta or para xylylenediamine with organic acids to form amides that serve as gas barrier layers. These amides are not liquids that can be used as coatings.

SUMMARY OF THE INVENTION

The present invention is the discovery of another type of polyepoxide-polyamine resin based liquid barrier coating which can substantially reduce gas permeation through polymeric containers and other packaging materials. The coatings of the present invention have exceptionally low oxygen permeability at amine hydrogen to epoxy equivalent cure ratios lower than 1.5 to 1. The amine nitrogen content of these cured coatings may be less than seven percent, with good results being attainable a low as four percent or lower. The relatively lower amine content of the present invention generally has the advantage of less yellowing of the coating over time.

The coatings of the present invention are the cured reaction product of a polyamine with a polyepoxide having the structure

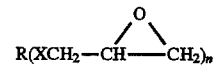

where

R is phenylene or naphthylene;

X is O or C(O)—O or combinations thereof; and n is 2–4.

Also included are chain extensions of the above polyepoxides, generally in the case of n=2, represented by the following structure:

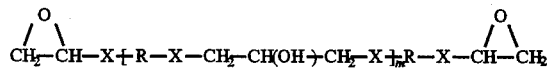

where

R is phenylene or naphthylene;

X is O or C(O)—O or combinations thereof; and m is 0–10.

These are chiefly the polyglycidyl ethers of resorcinol and the polyglycidyl esters of phthalic acid, and the naphtha analogs of both.

Preferred polyamines for reacting with the polyepoxides disclosed above for curing the coatings of the present invention are aromatic-containing polyamines having groups of the type >NRΦRN< where R is alkyl containing 1 or 2 carbons, and Φ is phenylene or naphthylene. A characteristic of the preferred type of polyamine is that it contains at least fifty percent of its carbon atoms in aromatic rings. In a particularly useful embodiment, R in the >NRΦRN< group contains a single carbon atom, whereby at least seventy percent of the carbon atoms are in the aromatic rings. In a specific example, this may be a polyamine which is an aminomethyl poly-substituted benzene or naphthalene, e.g., xylylene aliamine.

The polyamines or polyamine adducts may be cured with the polyepoxide compounds defined above to form the cured coatings of the present invention. Polyamine functional adducts may be formed in a preliminary reaction prior to curing by reacting a polyamine with a variety of polyepoxides known for use for reacting with polyamines to form cured films. However, preferred embodiments having excellent resistance to loss of barrier properties under high humidity conditions employ polyepoxide curing components having the same characteristics of those used for curing as set forth above. Thus, the preferred adduct embodiments are made from resorcinol diglycidyl ether and polyamine. However, acceptable adducts have been made from bisphenol type epoxies, provided that only limited amounts of bisphenol residue groups are incorporated into the polymeric network of the cured coating, i.e., no more than 30 percent by weight. It is also preferred that the polyamine component includes no unsubstituted alkyl groups greater than two carbon atoms in length between amine groups.

When curing the polyamine or polyamine functional adduct with the polyepoxide curing agent, the cure ratio is less than 1.5:1, preferably at least 1:1, equivalents of amine hydrogen in the polyamine component to equivalent of epoxy groups in the polyepoxide component.

In the preferred embodiments of the present invention, the cured coatings are characterized by a molecular network that consists predominantly of the following molecular groups:

(1) aromatic-containing polyamine groups of the type >NRΦRN< (where R is alkyl containing 1 or 2 carbons); and Φ is phenylene or naphthylene;

(2) —$CH_2CH(OH)CH_2$- groups (2-hydroxypropylene groups); and (3) —O—Φ—O— groups. Cured coatings whose molecular network is constituted from these groups have been found not only to have excellent gas barrier properties, but also to have the ability to maintain low permeability under high humidity conditions. Excellent barrier properties can be attained when the cured film network contains only or substantially only (at least 85 weight percent, preferably at least 90 weight percent, most preferably at least 95 weight percent) of the three molecular groups set forth above.

It should be understood that significant improvements in accordance with the present invention may be attained without the optimum levels of the preferred groups described above. Although not preferred, minor amounts of bisphenol residues in the cured film network in minor amounts may be acceptable for some purposes. Also, >NRΦRN< groups may be replaced with >NR'N< groups, wherein R' is an alkyl group which includes no unsubstituted alkyl chains greater than two carbon atoms in length. In addition, the molecular network may contain additional molecular groups such as —O—Φ-N< groups. While maximizing the content of the preferred molecular groups is generally desirable, it has been found to be additionally advantageous that the content of certain molecular groups be minimized in, or absent from, the cured polymer network. The groups that are preferably avoided include unsubstituted alkyl chains greater than two carbon atoms in length. In particular, butylene groups have been found to be detrimental.

In further accordance with the present invention, a packaging material is provided which includes at least one layer of a relatively gas-permeable polymeric material and at least one layer of a polyamine-polyepoxide barrier coating as defined above. The composite packaging material exhibits gas permeabilities as set forth above in connection with the description of the barrier coating itself. The barrier coating included in the packaging material may be applied to one or more surfaces of the polymeric material, or it may be laminated between two layers of the polymeric material. Stock sheets are contemplated that may be used as wrappings or formed into containers or other articles. Alternatively, a container or other article may be formed from the polymeric material and the barrier coating of the present invention applied onto the surface of the formed article such as by spraying, roll coating, or other conventional method of coating. For these purposes, the barrier coating compositions of the present invention have the rheological characteristics of liquid coating compositions.

DETAILED DESCRIPTION OF THE INVENTION

By the term "barrier material" as used throughout this description is meant that such a material has a low permeability to gases such as oxygen and/or carbon dioxide, i.e., the material exhibits a high resistance to the passage of oxygen or carbon dioxide through the material. Permeation through a material is a function of the thickness of the material. The barrier materials of the present invention exhibit a combination of relatively high resistance to both carbon dioxide and oxygen, but many applications do not require resistance to both. Therefore, low permeability to either carbon dioxide or oxygen as defined below is sufficient to qualify the material as a "barrier material."

The performance of the barrier coatings of the present invention may be characterized by the small extent to which the permeability differs at high humidity compared to low or moderate humidity, regardless of the magnitude of the permeability. A less than optimum permeability could be compensated for by applying a thicker coating, but it may be impractical to use a coating thick enough to assure good barrier properties, particularly at elevated humidities. Some prior art epoxy-amine barrier coatings have permeabilities at 75 percent relative humidity (R.H.) that are many times greater than at 50 percent R.H. Embodiments of the barrier coatings of the present invention are characterized by permeabilities at 75 percent R.H. which are no more than 5 times greater than at 50 percent R.H., and less than three times in preferred embodiments.

To be useful commercially, the permeability of a barrier coating must lead to a sufficient increase in shelf life of the product to justify the extra cost of the coating. Also to be taken into account is the fact that, although thicker barrier coatings may provide adequate improvements in shelf life, the added cost of the coating may not be economically justified. It is generally desirable for the desired barrier property to be attained with a dry coating no more than 1 mil thick, preferably on the order of about 0.5 mil or less in order to keep the cost of adding the barrier coating to a container low. At these typical thicknesses, useful improvements in shelf life generally occur when the barrier coating possesses an oxygen permeability constant of less than 0.60 cc-mil/100 $in^2$/atm./day (a standard unit of permeation, measured as cubic centimeters of gas permeating through a one mil thick sample, 100 inches square, over a 24 hour period, under a partial pressure differential of one atmosphere), more notably at an oxygen permeability constant of less than 0.50 cc-mil/100 in$^2$/atm./day, and even more advantageously at an oxygen permeability constant of less than 0.30 cc-mil/ 100 in$^2$/atm./day. Prior art polyepoxide-polyamine barrier coatings able to attain the lowest levels of permeability have been found to be particularly sensitive to humidity, whereby the permeability increases substantially at humidities as high as 75 percent R.H. Preferred embodiments of the barrier coatings of the present invention not only have the low permeabilities that permit the use of thin coatings, but also are capable of maintaining these levels of permeability at high humidities, e.g., 75 % relative humidity (R.H.).

The highest performing compositions of the present invention exhibit both low initial permeability and minimal increase under high humidity conditions, but it should be apparent that those embodiments that have extremely low initial permeability have greater leeway as to the degree to which permeability may increase under high humidity conditions.

Permeability constants for both oxygen and carbon dioxide, as well as other gases, often tend to increase or decrease together. Although the coatings of the present invention have been designed to provide low oxygen permeability, low carbon dioxide permeabilities may also be attained. Carbon dioxide permeabilities of less than 3 cc-mil/100 in$^2$/atmosphere/day (measured at 30° C. and zero percent relative humidity) may be exhibited by barrier coatings of some embodiments of the present invention. However, it should be understood that it is not necessary for a barrier coating of the present invention to provide both excellent oxygen barrier properties and excellent carbon dioxide barrier properties to be useful.

Generally, it has been found that as the amount of amine nitrogen in a barrier material increases, gas permeability decreases. In commonly owned U.S. Pat. No. 5,300,541, barrier coatings exhibiting very low carbon dioxide permeability levels were characterized as having at least about seven percent by weight amine nitrogen, reflecting the dependance of carbon dioxide permeability on amine nitrogen content of the coating. Attaining the oxygen barrier properties of the present invention, however, is not as directly related to the amine nitrogen level as in that patent. Instead, the primary characteristic of the present invention is the molecular structure of the polymeric network of the cured coating as defined above. With this molecular structure, there is greater leeway as to the amine nitrogen content needed for useful barrier properties, particularly for oxygen. Therefore, there is no critical limitation as to minimum amine nitrogen content in the coatings of the present invention, and good barrier properties have been attained with amine nitrogen levels below seven percent. Preferred embodiments are generally characterized as having at least 4 weight percent amine nitrogen content in the cured film. Reducing the amine content of these coatings generally has the effect of reducing their susceptiblity to yellowing upon aging. U.S. Pat. No. 5,300,541 also discloses a preference for the sum of the nitrogen plus hydroxyl groups to be greater than 17 percent by weight of the cured polymeric content of the coating. The present invention is also freed from that constraint, with good results being obtained below 17 percent (N+OH) down to about 13 percent.

The polyamine-polyepoxide polymers that comprise the chief film-forming resin of the barrier coatings of the present invention are cured in situ from two components that are mixed immediately prior to application onto a plastic substrate. One component is a polyamine functional adduct and the other component is a polyepoxide, and the two components are reacted in a ratio of less than 1.5:1 equivalents of active amine hydrogens in the polyamine component to equivalent of epoxy group in the polyepoxide component. In general, it is not constructive to use equivalents ratios below a stoichiometric 1:1 ratio. The polyamine component may comprise a monomeric polyamine or a polyamine functional adduct made by reacting an initial monomeric polyamine as described above.

Forming a polyamine functional adduct by a preliminary reaction has the advantage of increasing molecular weight while maintaining linearity of the resin, thereby avoiding gellation. Using a polyamine having no more than two primary amino groups to make the adduct serves to avoid gellation. Additionally, the usual time period required for ingestion of epoxy and amine reactants before application onto a substrate is reduced or eliminated by pre-reaction to form an adduct. When an initial polyamine is prereacted to form an adduct, approximately 10 to 80 percent, preferably 20 to 50 percent, of the active amine hydrogens of the polyamine may be reacted with epoxy groups during formation of the adduct. Prereacting fewer of the active amine hydrogens reduces the effectiveness of the prereaction step and provides little of the linearity in the polymer product that is one of the advantages of forming the adduct. Prereacting larger portions of the active amine hydrogens is not preferred because sufficient active amine hydrogen groups must be left unreacted so as to provide reaction sites for reacting during the final curing step.

However, barrier coatings can be produced without the step of forming an adduct if the requirement for an ingestion period can be tolerated. Instead, all of the polyepoxide required for curing may be blended with the initial monomeric polyamine, and after allowing for an ingestion period, the mixture may be applied to the substrate and cured in place. Coatings produced by such a non-adduct approach may be considered theoretically equivalent to those produced using adduct.

The preferred embodiments of the initial polyamine monomers used as reactants to make the polyamine functional adduct or used directly in the final cure step are characterized by substantial aromatic content. More specifically, at least 50 percent, preferably at least 70 percent of the carbon atoms are in aromatic rings, including fused aromatic rings (i.e., phenylene groups and/or naphthylene groups). These may include aromatic amines in which the amine group is attached directly to the aromatic ring, or preferably aminoalkylene compounds in which amino group is attached to the aromatic group via an alkyl group. Preferably the alkylene group is a small alkylene group, most preferably a methylene group. In the latter case, when the aromatic group is phenylene, the polyamine is xylylenediamine. Preferred adduct embodiments are made from xylylenediamine reacted with the same polyepoxides specified herein as the preferred curing agents, i.e., those containing —O—Φ—O— groups (e.g., resorcinol diglycidyl ether) or —O(O)C-Φ—C(O)O— groups (polyglycidyl esters of phthalic acid). However, acceptable adducts have been made from other types of polyepoxides, such as the bisphenol type epoxies. Use of these non-preferred types of polyepoxides for making the adducts is permitted because the contribution to the cured molecular network by the epoxy component of the adduct is much less than from the polyepoxy curing component. Bisphenol residue groups in the cured coating constitute no more than 30 percent by weight of the cured coating in preferred embodiments. Use of less preferred polyamines can also be tolerated for making the adducts. Therefore, polyalkylamines may be employed, provided that the polyalkylamine has no unsubstituted alkylene groups greater than two carbon atoms in length between amine groups (e.g., polyethylene polyamines). An example of a non-preferred type of adduct that may be employed within the broader aspects of the present invention is the reaction product of diglycidyl ether of bisphenol A (EPON 828) with tetraethylenepentamine.

Another preferred adduct embodiment entails reacting a monomeric polyamine with epichlorohydrin. By carrying out the reaction at polyamine to epichlorohydrin molar ratios greater than 1:1 (preferably 2:1) in the presence of an alkali, a primary reaction product comprises polyamine molecules joined by 2-hydroxypropylene linkages. The reaction of metaxylylenediamine, a preferred polyamine, with epichlorohydrin is described in U.S. Pat. No. 4,605,765, and such products are commercially available as "GASKAMINE 328" from Mitsubishi Gas Chemical Company.

The reaction of the polyepoxide and the polyamine to give the ungelled adduct is carried out at temperatures and concentrations of reactants sufficient to obtain the ungelled product and may vary depending upon selection of starting materials. Generally, reaction temperatures may vary from about 40° C. to 140° C., with lower temperatures (40° C. to 110° C.) being preferred for systems susceptible to gelation. Similarly, concentrations of reactants may vary from neat to as low as five percent by weight of reactant in an appropriate solvent depending upon the particular molar ratio and type of reactants. Lower concentrations will generally be required for systems susceptible to gelation. Specific reaction conditions may readily be chosen by one skilled in the art guided by the examples herein. Preparation of an ungelled amine-functional polymeric adduct is described in U.S. Pat. No. 5,006,381 (Nugent et al.), and the description of the preparation of such an ungelled resin is incorporated herein by reference.

By the term "ungelled" as used throughout this description is meant that such an amine-functional polymeric resin is a soluble or dispersible reaction product, the resin being fluid under processing conditions of the present invention.

The coatings of the present invention are cured reaction with a polyepoxide having the structure

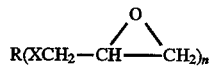

where

R is phenylene or naphthylene;

X is O or C(O)—O or combinations thereof; and n is 2–4. Also included are chain extensions of the above polyepoxides, generally in the case of n=2, represented by the following structure:

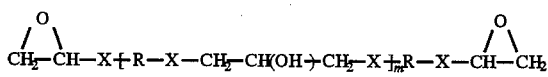

where

R is phenylene or naphthylene;

X is O or C(O)—O or combinations thereof; and m is 0–10.

The polyepoxides thus defined are chiefly the polyglycidyl ethers of resorcinol and the polyglycidyl esters of phthalic acid, and the naphtha analogs of both.

The polyepoxide curing component of the present invention are characterized by the presence of —O—Φ-O— groups (polyglycidyl ethers of phenols) or —O(O)C-Φ-C(O)O— groups (polyglycidyl esters of phthalic acid). Examples include polyglycidyl ethers of aromatic polyols, which may be formed by etherification of aromatic polyols with epichlorohydrin or dichlorohydrin in the presence of an alkali. These include: bis(2-hydroxynaphthyl)methane, 4,4'-dihydroxylbenzophenone, 1,5-dihydroxy-naphthalene and the like. Commercially available examples include resorcinol diglycidyl ether such as "HELOXY® 69" from Shell Chemical Co. and diglycidyl ester of phthalic acid such as "EPI-REZ® A-100 from Shell Chemical Co. Preferably, the polyepoxides used in forming the polyamine adduct and in the curing stage have epoxy functionality of at least 1.4, most preferable about 2 or greater. The presence of small amounts of monoepoxides may not be objectionable.

The epoxy group equivalent weight of the polyepoxide is preferably minimized so as to avoid unnecessarily introducing molecular groups into the cured polymeric network that are not the preferred groups of this invention. Generally, polyepoxides chosen for use as the curing component have epoxy equivalent weights less than 150 for the simplest member of a family (i.e., when n=2 and m=0 in the structures above; or disregarding oligomeric chain extensions). Polyepoxides having larger epoxy equivalent weights may be used for making the polyamine adducts. Molecular weights of polyepoxides used generally are above about 86, preferably from 200 to 1000, more preferably from 200 to 800.

In forming a cured barrier coating from the reaction of an adduct with a polyepoxide, the two components are preferably reacted together at a ratio of active amine hydrogens to epoxy groups less than 1.5:1 down to about 1:1. Each amine hydrogen of the amine-functional adduct is theoretically able to react with one epoxy group and is considered as one amine equivalent. Thus, a primary amine nitrogen is considered as difunctional in the reaction with polyepoxides to form the barrier material. Preferably, the cured reaction product contains a substantial number of unreacted amine hydrogens. Maximizing the amount of polyamine reactant is generally desirable for the sake of maximizing barrier properties, but insufficient numbers of epoxy groups may not provide enough crosslinking to yield a strong, moisture resistant, solvent resistant film. Also, the use of more epoxy than the preferred amounts can produce excessive crosslinking and a film that is too brittle. When polyepoxides are employed in both the adduct-forming stage and the curing stage, they may be the same polyepoxide or they may be different polyepoxides. Mixtures of either the polyepoxides or polyamines that are recommended herein may be used in place of the pure compounds.

The cured polymeric network of the barrier coating comprises the residues of the polyamine and polyepoxide components. The preferred embodiments have been found to be those with high content of aminomethyl substituted benzene or naphthalene (e.g., >N—CH$_2$—Φ—CH$_2$—N<, the residue of xylylenediamine groups), phenylene or naphthylene ether or ester groups (—O—Φ—O— or —O(O)C—Φ—C(O)O—), linked with 2-hydroxypropylene groups (—CH$_2$—CH(OH)—CH$_2$—, the residue of glycidyl groups). The preferred embodiments are characterized by cured networks in which the combination of >N—CH$_2$—Φ—CH$_2$—N< groups, —O—Φ—O— or —O(O)C—Φ—C(O)O— groups, and —CH$_2$—CH(OH)—CH$_2$— groups comprises at least 65 percent, preferably at least 80 percent, most preferably at least 95 percent by weight of the cured network. A preferred example in which the network consists essentially of these three groups is represented by metaxylenediamine cured with diglycidyl ether of resorcinol.

It should be apparent that the desired molecular groups may be introduced into the cured polymeric network by the initial polyamine, the polyamine adduct, or the polyepoxide curing component. It should also be apparent that the various substitutions on the aromatic members described above may be provided in combination with each other on the same molecule in the reactants.

The diglycidyl ethers of bisphenol such as diglycidyl ether of bisphenol A or diglycidyl ether of bisphenol F are not preferred in the present invention, although they may be tolerated for the purpose of making the polyamine adduct. The cured molecular network may contain up to 30 percent by weight of the residue of bisphenol groups, but preferred embodiments contain none. If any bisphenol epoxies are to be included, diglycidyl ethers of bisphenol F are preferred over bisphenol A based epoxides for the sake of low oxygen permeability. It is theorized that the presence of methyl groups in bisphenol A has a detrimental effect on oxygen barrier properties. Thus, isopropylidene groups as contained in bisphenol A are preferably avoided. Other unsubstituted alkyl groups are believed to have a similar effect, particularly unsubstituted alkyl groups containing a carbon chain longer than two, and constituents containing such groups (e.g., diglycidyl ether of 1,4-butanediol) are preferably avoided in the present invention.

Solvents for use in the composition of the present invention must be compatible with the plastic substrates being coated and should be chosen so as to provide desirable flow properties to the liquid composition upon application. Suitable solvents for use with the compositions of the present invention are preferably oxygenated solvents, such as glycol ethers, e.g., 2-methoxyethanol, -ethoxyethanol, 2-propoxyethanol, 2-butoxyethanol, 1-methoxy-2-propanol and the like, or alcohols such as methanol, ethanol, propanol and the like. Glycol ethers, such as 2-butoxyethanol and 1-methoxy-2-propanol, are more preferred with 1-methoxy-2-propanol being most preferred. The use of 1-methoxy-2-propanol is preferred for its rapid evaporation rate, which minimizes solvent retention in the cured film. In order to obtain desired flow characteristics in some of the embodiments using a prereacted adduct, use of 2-butoxyethanol may be preferred. In embodiments not requiring slow evaporating solvents for the sake of flow properties, the solvents listed here may be diluted with less costly solvents such as toluene or xylene. The solvent may also be a halogenated hydrocarbon, for example, a chlorinated hydrocarbon, such as methylene chloride, 1,1,1-trichloroethane and the like (usually considered fast evaporating solvents), may be especially useful in obtaining cured barrier films. Mixtures of such solvents may also be employed. Non-halogenated solvents are preferred where the resultant barrier material is desired to be halide-free. The resin may also be in an aqueous medium, i.e., the ungelled amine-functional polymeric resin may be an aqueous solution or dispersion. For example, when the polyepoxide used in curing the coating is a water-soluble polyepoxide, the ungelled amine-functional polymeric resin can be utilized as an aqueous solution. Otherwise, with water-insoluble polyepoxides, the ungelled amine-functional polymeric resin can have sufficient amine groups neutralized with an organic acid, such as formic acid, lactic acid, or acetic acid, or with an inorganic acid, such as hydrochloric acid or phosphoric acid, to allow solubilization of the ungelled amine-functional polymeric resin in an aqueous medium. An organic acid is preferably used.

The present invention is further concerned with packaging materials and containers formed of a barrier material or packaging materials and containers including a barrier material. Such packaging materials and/or containers would be desired to have some or all of the following properties:(1) low oxygen permeability, e.g., for the protection of package contents such as food from external oxygen, (2) low carbon dioxide permeability, e.g., for the retention of carbon dioxide gas within a container, (3) good adhesion to gas-permeable polymeric materials used in forming multilayer packaging materials or multilayer containers, (4) resistance to substantial change in permeability under high humidity conditions, (5) good flexibility, (6) high impact resistance, (7) low processing and cure temperatures for use with heat-sensitive substrates, e.g., certain gas-permeable polymeric materials, (8) high gloss, and (9) good clarity. In addition, the barrier materials utilized in packaging materials or containers of this invention can be and are preferably characterized as halide-free.

In the packaging materials and containers of the present invention, barrier materials formed from the coating compositions of the present invention may be used in combination with any polymeric material used in conventional packaging materials and containers, e.g., polyolefins such as polyethylene or polypropylene, polyesters such as poly(ethylene terephthalate), polycarbonates and the like. Many polymeric materials, such as, e.g., polyolefins and polycarbonates, are known to be very gas-permeable. The term "gas-permeable" is used herein to mean that such a polymeric material has a gas permeability greater than that of the barrier materials, usually at least twice as great. Gas-permeable polymeric materials are generally more limited for use as packaging of oxygen-sensitive foods or beverages, or for packaging of carbonated beverages. The herein described barrier materials are especially suitable for use in combination with polymeric materials such as polyolefins or polycarbonates. Polyolefins and polycarbonate materials have both high oxygen permeabilities and carbon dioxide permeabilities, i.e., values generally greater than 100 cubic centimeters (cc) of oxygen and greater than 250 cc of carbon dioxide permeating a one-mil thick sample, 100 inches square over a 24-hour period under an oxygen or carbon dioxide partial pressure differential respectively of one atmosphere (100 cc-mil/100 in$^2$-day-atmosphere) at 23° C. and a relative humidity of zero. The containers or packaging materials of this invention may also incorporate one or more other polymeric materials such as, e.g., polyvinylidene chloride, polyacrylonitrile, polystyrene, acrylonitrile-styrene copolymers, polyamides, polyfluorocarbons, and blends or other combinations of such materials.

The barrier materials can be applied as either solvent or aqueous-based thermosetting coating compositions onto other polymeric materials, e.g., packaging materials or containers, by any conventional means such as spraying, rolling, dipping, brushing and the like. Spray applications or roll applications are preferred. For example, conventional spray techniques and equipment for applying curable coating components can be utilized.

Generally, the solution of the amine-functional polymeric resin ready for application will have a weight percent of resin solids in the range of from about 15 percent by weight to about 50 percent by weight, preferably from about 25 to about 40 percent by weight for embodiments employing the prereacted adduct approach. Higher weight percent solids may present application difficulties, particularly with spray application, while lower weight percentages will require removal of greater amounts of solvent during a heat-curing stage. For the embodiments using direct reaction of the polyamine and polyepoxide, solids contents above 50 percent can be applied successfully.

Coating compositions of this invention can further include other additives including pigments, catalysts for coating compositions which involve an epoxy-amine reaction, silicones or surfactants. For example, the addition of pigments can further reduce the gas permeability of the resultant barrier material. Among the useful pigments in decreasing the gas permeabilities may be included titanium dioxide, micas, silica pigments, talc and aluminum or glass particulates, e.g., flakes. Micas, aluminum flakes and glass flakes may be preferred due to a plate-like structure of such pigments. Generally, when pigments are included in the coating compositions, the weight ratio of pigment to binder is about 1:1, preferably about 0.3:1, and more preferably about 0.05:1, the binder weight being the total solids weight of the polyamine-polyepoxide resin in the coating composition.

Silicones may be included in coating compositions of this invention to assist in wetting of gas-permeable polymeric surfaces. Suitable silicones include various organosiloxanes such as polydimethylsiloxane, polymethylphenylsiloxane and the like. Exemplary are SF-1023 silicone (a polymethylphenylsiloxane available from General Electric Co.), AF-70 silicone (a polydimethylsiloxane available from General Electric Co.), and DF-100 S silicone (a polydimethylsiloxane available from Mazer Chemicals, a division of PPG Industries, Inc.) Such silicones may be added to the coating compositions in amounts of from about 0.01 to about 1.0 percent by weight based on total resin solids in the composition.

Surfactants may be included in aqueous-based coating compositions of the present invention, such as when the ungelled amine-functional polymeric resins are in aqueous solution. Such surfactants may generally be any suitable nonionic or anionic surfactant and may be employed at levels of about 0.01 to about 1 percent by weight basis total weight of the solution.

Among the catalysts which may be included in the coating compositions are those generally used for epoxy-amine reactants such as dihydroxy aromatics (e.g., resorcinol), triphenyl phosphite, calcium nitrate and the like.

In application of a thermosetting coating composition onto a substrate to form a layer of a barrier material, the components of a coating composition, e.g., a polyepoxide and the ungelled amine-functional polymeric resin, are first thoroughly mixed and then applied by appropriate means such as spraying. After mixing, the coating composition can also be held for a period of time (referred to as an ingestion time) from about 5 minutes to about 60 minutes prior to application to improve cure and clarity. This ingestion time can generally be eliminated when the polyamine is a prereacted adduct or when the solvent is 2-butoxyethanol. After application of the coating composition, it may be cured at temperatures as low as ambient temperature, i.e., about 70° F., by allowing for a gradual cure over several hours to several days or longer. However, such low temperature curing is slower than desired for commercial production lines and is not as efficient in removing solvent from the cured coating. Therefore, it is preferred that the coating be cured by heating at elevated temperatures as high as possible without distorting the plastic substrates and sufficiently high to effectively drive the particular solvent from the coating. For a relatively "slow" solvent, that is, a solvent having a relatively low evaporation rate, temperatures from about 130° F. to about 230° F., preferably from about 160° F. to about 200° F. for from about 1 minute to about 60 minutes may be suitable. For relatively "fast" solvent, that is, a solvent having relatively high evaporation rate, temperatures in the range of 100° F. to 160° F., preferably from about 120° F. to 150° F., may be suitable. The thermosetting coating composition may be applied and cured as a single layer or may be applied as multiple layers with multiple heating stages to remove solvent from each subsequent layer.

Multilayer packaging materials of the present invention comprise at least one layer of a gas-permeable polymeric material and at least one layer of a barrier material that is the cured reaction product as described herein. In one embodiment, a laminate including a barrier layer may be formed, e.g., by spray application of the coating composition onto a first layer of a gas-permeable polymeric material. Thereafter, a second layer of a similar or dissimilar gas-permeable polymeric material may be applied over the barrier layer to form a laminate and heated as previously described or optionally heated under pressure.

In embodiments of multilayer packaging material of the present invention in which polypropylene (or any other polyolefin) is the gas-permeable polymeric material, the surface of the polypropylene is preferably treated to increase surface tension by, e.g., flame-treating, corona-treating and the like, all of which are well known to those skilled in the art. Such treatments are described in detail by Pinner et al. in *Plastics: Surface and Finish*, Butterworth & Co. Ltd. (1971), Chapter 3, on surface treatments for plastic films and containers, and this description of surface treatments is herein incorporated by reference. Such treatments promote better adhesion of the barrier layer to polyolefin material.

The above-described multilayer packaging materials may be formed into containers by conventional plastic processing techniques. For example, sheets, films, and other structures may be formed by well known lamination or extrusion techniques. Film or sheet material made from the multilayer packaging material may be formed into articles such as wrappers, bags and the like.

Optionally, containers including at least one layer of a gas-permeable polymeric packaging material can be preformed into any desired shape and then at least one layer of a barrier coating of the present invention can be applied onto the preformed container in a similar manner as described for the multilayer packaging materials. The multilayer containers and multilayer packaging materials of the present invention are ideally suited for packaging of food, beverages, medicines and like substances. The principal advantage of the packaging materials and containers of this invention is the overall reduction in the transport of gases through the container walls. To achieve this reduction it is not necessary that the entire surface area of the container be coated with the barrier material. The barrier materials of the preferred embodiments of the present invention are capable of such significant reductions in permeability that coating, for example, only about 50 percent or less of the container's surface area may yield a major increase in self life of the product. Coating only a portion of the surface area is advantageous in that the coating process may be simplified by applying the barrier material only onto areas of the container that are relatively easy to coat, such as the vertical side walls. The barrier material may also be limited to areas on the container that are to be covered by a label or other opaque material, thereby lessening the appearance requirements for the barrier material. The lower the permeability of the uncoated packaging material, the smaller the area that need be coated with the barrier material of the present invention. For example, containers of poly(ethylene terephthalate) have sufficiently good barrier properties that they are particularly suitable for partial coatings of the barrier material.

The multilayer packaging material and containers of the present invention do not require the use of adhesives, tie layers or the like between the respective gas-permeable polymeric materials and the barrier materials.

While barrier materials of this invention have been described as useful as coatings on a variety of gas permeable polymeric materials, it should be readily apparent to those reading this specification that such barrier materials may be utilized otherwise than with gas permeable polymeric materials and may be useful, e.g., as coatings on metal surfaces where contact with, e.g., oxygen, is sought to be minimized. Such barrier materials may also be used without any other polymeric material. For example, such barrier materials may be formed into thin films such as those films commonly sold for home use storage of, e.g., food items in refrigerators and/or freezers.

It is an advantage that the cured barrier coatings of the present invention are thermoset polymers. This is preferred for food and beverage containers so that rubbing of adjacent containers during transit does not cause localized softening of the barrier coatings and possible damage to the coating.

The present invention is more particularly described in the following examples which are intended as illustration only since numerous modifications and variations will be apparent to those skilled in the art.

The following description of Adducts A and B are examples of the preparation of ungelled amine-functional polymeric adducts that are subsequently cured to form barrier materials by reaction with polyepoxide as will be described in a subsequent section.

ADDUCT A

An ungelled epoxy-amine adduct was prepared as follows. A reaction vessel was charged with 1 mole (189 grams) of tetraethylenepentamine and 1161 grams of 1-methoxy-2-propanol. The admixture was heated to 100° C under a nitrogen atmosphere, and a mixture of 0.857 mole (322 grams) of EPON-828 epoxy and 1979 grams of 1-methoxy-2-propanol was added over 1 hour. The reaction mixture was held at 100° C. for a total of about 2 hours. The mixture was then cooled to 70° C. and vacuum stripped. The resultant material had a theoretical molecular weight of about 3600, a percent solids as measured at 110° C. for one hour of 30.1, and a theoretical amine hydrogen equivalent weight of about 98.

ADDUCT B

An ungelled epoxy-amine adduct was prepared as follows. A reaction vessel was charged with 0.5 mole (68 grams) of MXDA and 418 grams of 1-methoxy-2-propanol. The admixture was heated to 100° C. under a nitrogen atmosphere, and a mixture of 0.429 mole (112 grams) of Heloxy 69 (resorcinol diglycidyl ether) and 685 grams of 1-methoxy-2-propanol was added over 1 hour. The reaction mixture was held at 100° C. for a total of about 2 hours. The mixture was then cooled to 70° C. and vacuum stripped. The resultant material had a theoretical molecular weight of about 2510, a percent solids as measured at 110° C. for one hour of 52.1, and a theoretical amine hydrogen equivalent weight of about 157.

COATING PREPARATION AND TESTING

Coating compositions were prepared from polyamines, including the adducts described above, cured with various polyepoxides as indicated in Table 1, and tested for oxygen permeability. The permeability results at various relative humidity levels are set forth in Table 2. The polyepoxides used for curing were: "EPON 828," a diglycidyl ether of bisphenol F from Shell Chemical Company; "HELOXY® 69," a diglycidyl ether of resorcinol from Shell Chemical Company; "EPI-REZ® A-100," an diglycidyl ester of phthalic acid from Shell Chemical Company; and "HELOXY® 67," a diglycidyl ether of 1,4-butanol from Shell Chemical Company.

Each coating example preparation involved adding to a sample container the polyamine component in 1-methoxy-2-propanol ("DOWANOL® PM" from Dow Chemical Company), a small amount of water (about 3–5 percent of resin solids), and a small amount of "SF-1023" silicone surfactant from General Electric (about 0.2 percent based on resin solids). The sample was stirred by hand until homogeneous, and the amount of polyepoxide indicated in Table 1 was added to yield the NH/epoxy ratios, amine nitrogen content and (N+OH) content indicated in Table 1. The sample was again stirred until homogeneous and then allowed to stand for a length of time adequate to allow sufficient ingestion to occur such that clear films could be obtained (about one hour). Sufficient 1-methoxy-2-propanol was included to yield a coating composition of 35–40 percent solids. A 0.028 inch wire wound bar was used to draw down the sample on 2 mil polyethylene terephthalate (PET) or polypropylene (PP) film. The coated film sample was heated for 30 minutes at 145° F. in a laboratory oven to produce a cured coating of about 0.5–0.6 mil. The coating sample was allowed to age at ambient temperature for four days prior to testing. Oxygen transmission rates were measured at 30° C. using an OXTRAN 1000 for the 0% relative humidity and 20–25% relative humidity results, and an OXTRAN 2/20 for the 50–55% relative humidity and 70–75% relative humidity results. The 20–25% relative humidity results from the OXTRAN 1000 were obtained using water in the instrument's test gas bubbler tubes. Oxygen permeability constants for the coating samples were calculated from the results for the coated PET or PP samples using the following equation:

$$\frac{1}{R_1} = \frac{1}{R_2} + \frac{DFT}{P_{O2}}$$

where $R_1$=coated film transmission rate (cc/100 in²/atm./day)

$R_2$=PET or PP film transmission rate

DFT=coating dry film thickness (mil)

$P_{O2}$=oxygen permeability constant of coating (cc-mil/100 in²/atm/day)

TABLE 1

| Example | Amine | Epoxy | Wt. ratio Amine/Epoxy | Equiv. ratio NH/Epoxy | % N | % N + OH |
|---|---|---|---|---|---|---|
| 1. | Adduct A | HELOXY 69 | 10/12.9 | 1.0 | 5.9 | 16.7 |
| 2. | Adduct B | HELOXY 69 | 10/6.4 | 1.3 | 4.8 | 15.6 |
| 3. | Gaskamine 328 | HELOXY 69 | 10/23.6 | 1.0 | 5.1 | 16.0 |
| 4. | Gaskamine 328 | EPON 828 | 10/33.6 | 1.0 | 3.9 | 12.2 |
| 5. | MXDA | HELOXY 69 | 10/29.4 | 1.3 | 5.2 | 16.4 |

TABLE 1-continued

| Example | Amine | Epoxy | Wt. ratio Amine/Epoxy | Equiv. ratio NH/Epoxy | % N | % N + OH |
|---|---|---|---|---|---|---|
| 6. | MXDA | HELOXY 67 | 10/28.7 | 1.3 | 5.3 | 17.7 |
| 7. | Adduct B | EPI-REZ A-100 | 10/8.5 | 1.2 | 4.2 | 14.9 |
| 8. | Adduct B | HELOXY 67 | 10/6.2 | 1.3 | 4.8 | 16.2 |

TABLE 2

| | Oxygen Permeability (cc-mil/100 in²/atm/day) | | | |
|---|---|---|---|---|
| Example | 0% R.H. | 20–25% R.H. | 50–55% R.H | 70–75% R.H. |
| 1. | 0.35 | 0.20 | 0.35 | 0.36 |
| 2. | 0.18 | 0.11 | 0.15 | 0.23 |
| 3. | 0.23 | 0.13 | 0.17 | 0.18 |
| 4. | 3.33 | 1.86 | 2.52 | 2.54 |
| 5. | 0.17 | 0.09 | 0.10 | 0.11 |
| 6. | 10.64 | 17.49 | 16.75 | 24.33 |
| 7. | 0.47 | 0.38 | 0.22 | 0.31 |
| 8. | 1.75 | 0.93 | 1.32 | 3.45 |

The invention has been described in connection with specific embodiments in order to prove the best mode of the invention, but it should be understood that other variations and modifications as are known to those of skill in the art may be resorted to without departing from the scope of the invention as defined by the claims which follow.

I claim:

1. A barrier coating comprising the reaction product of a polyamine (A) with a polyepoxide (B) at a ratio of active amine hydrogen in (A) to epoxy group in (B) of less than 1.5:1, wherein the polymer network of the barrier coating, when cured, has an amine nitrogen content of less than 7 percent by weight based on the total weight of the cured barrier coating, wherein the polyamine (A) is an adduct of a polyamine monomer and a polyepoxide, and wherein the polyepoxide (B) comprises the structure:

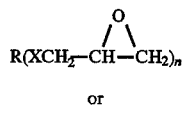

or

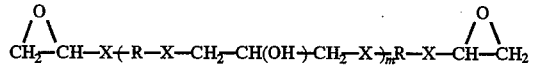

where
R is phenylene or naphthylene;
X is O or C(O)—O or combination thereof;
n is 2–4; and
m is 0–10
and wherein said polyamine monomer comprises an aminoalkylene polysubstituted aromatic compound in which at least 50 percent of the carbon atoms are aromatic and which includes no unsubstituted alkylene groups greater than two carbon atoms in length.

2. The coating of claim 1 wherein the polyamine monomer is a compound in which at least 7% of the carbon atoms are aromatic and includes no unsubstituted alkylene groups greater than two carbon atoms in length.

3. The coating of claim 2 wherein the polyamine monomer is a compound in which at least 70% of the carbon atoms are in phenylene or a naphthylene rings.

4. The coating of claim 1 wherein the polyamine monomer is an aminomethylene polysubstituted benzene or naphthalene compound.

5. The coating of claim 1 wherein the polyamine monomer is xylylenediamine.

6. The coating of claim 1 wherein the polyepoxide from which the adduct is made comprises the structure:

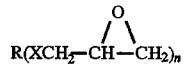

or

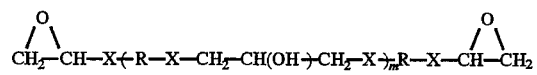

where
R is phenylene or naphthylene;
X is O or C(O)—O or combinations thereof;
n is 2–4; and
m is 0–10.

7. The coating of claim 1 wherein the polyepoxide from which the adduct is made comprises a glycidyl ether of a bisphenol.

8. The coating of claim 1 wherein the polyamine monomer from which the adduct is made comprises a polyalkylene amine having no unsubstituted alkylene groups greater than two carbon atoms in length.

9. The coating of claim 8 wherein the polyamine monomer from which the adduct is made further comprises a polyethylene amine.

10. The coating of claim 1 comprising a cured polymer network containing at least 65 percent on a weight basis of the combination of >N—CH$_2$—Φ—CH$_2$—N< groups, —O—Φ—O— or —O(O)C—Φ—C(O)O— groups, and —CH$_2$—CH(OH)—CH$_2$— groups
wherein Φ is phenylene or naphthylene.

11. The coating of claim 1 comprising a cured polymer network containing at least 80 percent on a weight basis of the combination of >N—CH$_2$—Φ—CH$_2$—N< groups, —O—Φ—O— or —O(O)C—Φ—C(O)O— groups, and —CH$_2$—CH(OH)—CH$_2$— groups
wherein Φ is phenylene or naphthylene.

12. The coating of claim 1 comprising a cured polymer network containing at least 95 percent on a weight basis of the combination of >N—CH$_2$—Φ—CH$_2$—N< groups, —O—Φ—O— or —O(O)C—Φ—C(O)O— groups, and —CH$_2$—CH(OH)—CH$_2$— groups
wherein Φ is phenylene or naphthylene.

13. The coating of claim 1 comprising a cured polymer network containing at least 65 percent on a weight basis of the combination of >N—CH$_2$—Φ—CH$_2$—N< groups, —O—Φ—O— or —O(O)C—Φ—C(O)O— groups and —CH$_2$—CH(OH)—CH$_2$— groups; and no more than 30 percent of bisphenol residue groups.

14. The coating of claim 1 wherein the amine nitrogen content of the cured barrier coatings polymer network is at least 4 percent by weight.

15. The coating of claim 1 wherein the amine nitrogen plus hydroxyl group content of the cured barrier coatings polymer network is less than 17 percent by weight.

16. A packaging material comprising a layer of a gas permeable polymeric material having coated thereon the coating of claim 1.

17. A container comprising a body molded from a gas permeable polymeric material having coated thereon the coating of claim 1.

18. A barrier coating comprising the reaction product of a polyamine (A) with a polyepoxide (B) at a ratio of active amine hydrogen in (A) to epoxy group in (B) from between at least 1.3:1 to less than 1.5:1, wherein the polymer network of the barrier coating, when cured, has an amine nitrogen content of less than 7 percent by weight based on the total weight of the cured barrier coating, wherein the polyamine (A) is a polyamine monomer, and wherein the polyepoxide (B) comprises the structure:

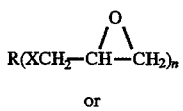

or

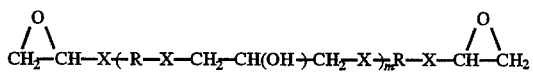

where

R is phenylene or naphthylene;

X is O or C(O)—O or combinations thereof;

n is 2–4; and m is 0–10 and wherein said polyamine monomer comprises an aminoalkylene polysubstituted aromatic compound in which at least 50 percent of the carton atoms are aromatic and which includes no unsubstituted alkylene groups greater than two carbon atoms in length.

19. The coating of claim 18 wherein the polyamine monomer is xylylenediamine.

20. The coating of claim 18 wherein the amine nitrogen content of the cured barrier coating's polymer network is at least 4 percent by weight.

21. The coating of claim 18 wherein the amine nitrogen plus hydroxyl group content of the cured barrier coating's polymer network is less than 17 percent by weight.

22. A packaging material comprising a layer of a gas permeable polymeric material having coated thereon the coating of claim 18.

23. A container comprising a body molded from a gas permeable polymeric material having coated thereon the coating of claim 18.

* * * * *

UNITED STATES PATENT AND TRADEMARK OFFICE
CERTIFICATE OF CORRECTION

PATENT NO. : 5,637,365
DATED : June 10, 1997
INVENTOR(S) : Leland H. Carlblom

It is certified that error appears in the above-identified patent and that said Letters Patent is hereby corrected as shown below:

| | |
|---|---|
| Claim 2, line 2: | Delete "7%" and insert --70%-- |
| Claim 8, line 2: | Insert --further-- between "made" and "comprises" |
| Claim 13, last line: | Insert before the "." --wherein φ is phenylene or naphthylene-- |
| Claim 13, line 4: | Insert --,-- after "groups" |
| Claim 18, line 3 from end: | Delete "carton" and insert --carbon-- |

Signed and Sealed this

Thirtieth Day of June, 1998

Attest:

BRUCE LEHMAN

Attesting Officer     Commissioner of Patents and Trademarks